United States Patent Office 3,355,400
Patented Nov. 28, 1967

3,355,400
POLYETHER-LIGNIN COMPOSITIONS
Keith L. Smith, Charleston, Nelson R. Eldred, South Charleston, George W. Buttrick, Charleston, and Alfred E. Winslow, Scott Depot, W. Va., assignors to Union Carbide Corporation, a corporation of New York
No Drawing. Filed Sept. 26, 1960, Ser. No. 58,157
6 Claims. (Cl. 260—17.5)

This invention relates to useful compositions produced by modification of waste liquors recovered in the papermaking industry. In a particular aspect, this invention relates to polyether-lignosulfonate compositions which are water-soluble thermoplastic materials having valuable properties for a variety of applications.

The disposal of sulfite spent liquor and other waste liquors long has been a classic pulp mill problem and serious efforts have been undertaken to find commercial uses for them. Such efforts have been handicapped by the fact that waste liquors in unmodified form have viscosities so low that they are unsuitable for use in many applications. Some attempts to modify the spent liquors for viscosity improvement have resulted in the production of materials which are completely water-insoluble and which are generally unsuitable for many desirable applications.

Lignin is the intercellular amorphous, non-cellulosic binding material in wood. Lignin and lignin derivatives are recovered as by-products of the wood-pulping industry. The term "lignin" as used herein is meant to include all effluent cooking solutions recovered as waste liquor from pulping processes, e.g., alkali and sulfite pulping processes. The waste liquors can be used directly in the practice of this invention, or the solids content of the waste liquors can be recovered and used without the liquid medium, or various lignin fractions may be separated and used individually.

The terms "lignosulfonic acids and salts," or "lignosulfonate," refer to lignin derivatives recovered from sulfite spent liquors of the wood-pulping industry, and to products produced by sulfonation of alkali lignin recovered from alkali wood-pulping processes.

The term "sulfite spent liquor solids" refers to the solids contained in spent liquors from the sulfite pulping process, the major portion of which consists of lignosulfonic acids.

Lignosulfonic acid and lignosulfonates result from the most common acid process, and sulfite process; alkali lignin is the most plentiful water-soluble product resulting from the removal of lignin from wood with an alkaline pulping liquor.

Alkali lignin and lignosulfonic acids and salts, whether in relatively purified form or in combination with other naturally derived products such as are present in wood-pulping waste liquors, are unsuited for many uses because of property limitations. In solid form, for example, they are friable, brittle, weak, have low or negligible resistance to impact, have a dark brown color and are unsuited for application as thermoplastic materials.

Accordingly, it is a main object of the present invention to provide a process for converting waste liquors from the papermaking industry economically into useful products having a wide variety of commercial applications.

It is another object of the present invention to provide low-cost, water-soluble, resinous compositions capable of forming coatings and films characterized by good tensile strength, flexibility, excellent elongation and resiliency.

It is another object of this invention to provide water-soluble resinous compositions derived from waste liquors useful as adhesives for cellulosic, plastic and other materials.

It is another object of the present invention to provide an efficient flocculant means for recovering lignin derivatives from the spent liquors of the papermaking industry.

It is another object of the present invention to provide a variety of improved lignin compositions which are useful as adhesive, molding, coating and film-forming thermoplastic materials, and as tackifiers, fillers and binders.

It is a further object of the present invention to provide compositions of poly(alkylene oxide) and lignin material which form films and coatings that have good tensile strength and improved stiffness as compared with poly(alkylene oxide).

It is another object of the present invention to provide lignin compositions that form coatings and films which are flexible, strong and have improved color, and impact resistance.

Other objects and advantages of the present invention will become apparent to one skilled in the art from the accompanying description and disclosure.

One or more objects of the present invention are accomplished by mixing together a resinous water-soluble polyether and waste liquor from the wood-pulping processes of the papermaking industry. The aqueous compositions so produced have a solids content comprising resinous polyether and lignin material. When a sulfite spent liquor is employed the solids content consists substantially of resinous polyether and lignosulfonic acids. These compositions can be sprayed, cast or calendered into flexible and extensible films and shapes. The aqueous solutions, other than sprayable solutions, may possess unusual rheological properties, described more fully hereinafter, useful in the control of casting and coating operations.

The resinous polyether-lignin solids can be recovered by evaporating the aqueous compositions to dryness. The solid polyether-lignin mixtures can be molded, cast or calendered into films and other shaped articles, and can be used as resilient binders for structural soils, and the like. The solid polyether-lignin compositions can also be obtained by adding the resinous polyether to spent liquor under strongly acidic conditions so as to cause formation and precipitation of the polyether-lignin composition.

Another method of preparing solid polyether-lignin compositions of this invention is by admixing powdered polyether with the substantially non-cellulosic lignin solids mixture recovered from wood-pulping liquors. The mixing is preferably accomplished thermoplastically such as on a two-roll mill.

Another useful method of preparing the solid polyether-lignin compositions is by mechanically blending water gels of the components with or without the use of heat. Mechanical blending may be advantageously combined with evaporation of solvent in the same equipment under vacuum.

By the term "polyether" or "polymeric ether compound" as used herein is meant polymeric materials which contain an average of at least about 400 non-cyclic aliphatic oxygen ether groups. The preferred polyether compounds are water-soluble polyether resins which have a molecular weight between about eighteen thousand and ten million and which contain an average of from 0.5 to 2.85 non-cyclic aliphatic oxygen ether groups per 100 molecular weight. The term "water-soluble" refers to polyethers which when initially polymerized have a solubility of at least 50 percent of their weight in water at a temperature of 25° C. The term "non-cyclic aliphatic oxygen ether" includes only those ether groups found in the straight or branched organic chains of the polyether molecules. Thus, for example, poly(ethylene oxide) possesses the repetitive unit —CH$_2$CH$_2$O— in the polymer chain; the oxygen atom in this repetitive unit would be considered to be a "non-cyclic aliphatic oxygen ether" group. On the other hand, any ether groups which form a portion of an organic ring such as, for example, the oxygen atom in tetrahydrofuran or the oxygen atoms in dioxane, are not counted or included in the term "non-cyclic aliphatic oxygen ether." The terms "an average of" or "at least an average of" are employed since the molecular weight or the number of etheric atoms found by analyzing the polyether, in the usual instance, will be an average value or average number. In the absence of suitable molecular weight determination, the polyethers are characterized as having a reduced viscosity in excess of 0.3 and not greater than 100 in the best solvent available for a particular polyether. Molecular weight may be determined by standard methods such as ultracentrifuge, light dissymmetry or osmotic pressure. Reduced viscosity may be determined with the Ubbelohde, the Ostwald or equivalent viscometer in the temperature range between 20° C. and 30° C., using a resin concentration in solution sufficiently low to produce an approximate linear relationship between reduced viscosity and polymer concentration and between infinite dilution and the concentration at which the reduced viscosity is determined. Reduced viscosity is defined by the expression:

$$I_r = \frac{T - T_0}{(T_0)(C)}$$

wherein T is the time required for a low concentrate polymer solution to pass through a standardizd Ubbelohde viscometer; wherein T$_0$ is the time for the pure solvent to pass through the viscometer; and wherein C is the concentration of the solution.

The water-soluble polymeric oxygen ether compound contemplated as starting material can be expressed in terms of non-cyclic aliphatic oxygen ether groups (or atoms) per 100 molecular weight. As stated hereinabove only those etheric atoms found in the straight or branched chains of the polyether molecule are counted; the oxygen atoms forming a part of an organic ring in the polyether molecule are excluded. Broadly, the number of non-cyclic aliphatic ether groups per 100 molecular weight contained by the polyether is in the range of from about 0.5 to 2.85 etheric groups per 100 molecular weight, and preferably the range is from about 0.5 to 2.3 etheric groups per 100 molecular weight. A highly desirable range is from about 1.0 to 2.3 etheric groups per 100 molecular weight, and an especially preferred range is from about 1.5 to 2.3 ether groups per 100 molecular weight. With reference to the abovesaid ranges, the lower limit of about 0.5 includes such compounds as phosphoric acid-diethylene glycol polyester (about 0.54), some methyl celluloses, and the like. The upper limit of 2.85 is restricted by 50/50 oxymethylene-oxyethylene copolymer, poly(dioxolane), and the like; the upper limit of 2.3 is restricted by poly(ethylene oxide). Poly(ethylene oxide) having a reduced viscosity above about 0.5 (at a concentration of 0.2 gram of polymer in 100 milliliters of acetonitrile at 30° C.) is eminently preferred. These poly(ethylene oxides) are hard, tough, horny, resinous materials. The polyether component contains at least an average of 400 etheric groups, preferably at least an average of 450 etheric groups, and still more preferably at least an average of 600 etheric groups. In a highly preferred embodiment the polyether component contains at least an average of 1000 etheric groups, this minimum limit, i.e., etheric groups, being approximately the point where poly(ethylene oxide) is a resinous compound such as described above.

The polyethers contemplated include, for example, the poly(alkylene oxides) prepared by polymerizing ethylene oxide, propylene oxide, epoxybutane, and the like, and mixtures thereof; the polyoxyalkylene glycols and ethers thereof such as can be made by reacting ethylene oxide, propylene oxide, etc., and mixtures thereof, with small amounts of hydroxylic compounds such as aliphatic alcohols, glycols, phenols, glycerol, sorbitol, and the like. Resinous homopolymers of 1,2-alkylene oxides as well as resinous copolymers of an admixture of 1,2-alkylene oxides (with reduced viscosities of at least about 0.5, as determined from a solution containing 0.2 gram of polymer in 100 milliliters of solvent such as acetonitrile at 30° C.) are highly preferred classes of polyethers. The 1,2-alkylene oxides can be, for example, ethylene oxide, propylene oxide, the epoxybutanes, the epoxypentanes, styrene oxide, chlorostyrene oxide, and the like. Polyethers prepared by reacting ethylene oxide, propylene oxide, and other olefinic oxides with synthetic and naturally occurring polymeric materials such as the novolaks, polyvinyl alcohol, polyamides, starches, cellulose, partially etherified cellulose, carboxymethyl cellulose, partially etherified starch, carboxymethyl starch, polycarboxylic acids (monomers and polymers), polysufonamides, polycarbamides, and the like, are suitable as are the polyethers prepared by the reaction of, for example, ethylene oxide and propylene oxide with the glucosides and sugars, e.g., methyl glucoside, sucrose, glucose, and the like. Moreover, polyethylene glycol and polypropylene glycol and ethylene oxide-propylene oxide copolymer glycols which haev been reacted with a diisocyanate, or a diepoxide such as diglycidyl diether of a bisphenol to provide longer chain polyether components are also suitable. The end groups of the polyalkylene-polyols and of the higher molecular weight resinous homopolymers and copolymers and other polyethers are not critical to the invention, and may be carboxylic ester groups, inorganic acid ester groups, amides, amines, as well as ether, halogen, acetal, hemiacetal, aldehyde or carboxyl. Fatty acid-derived hydrocarbon end groups may be attached, for example, through ester, amide, ether groups, and the like. These same organic functional groups can also be permitted as occasional or repetitive substituents, either attached to or within the backbone of the polyether chains, so long as they do not unduly lower the ether group concentration.

A detailed description of polyethers suitable in the practice of the present invention is disclosed in United States Patent #3,125,544, which is herein incorporated by reference.

The lignin component of the resinous compositions of this invention is selected from the substantially non-cellulosic solids contained in the waste liquors recovered in the papermaking industry from the commercial wood-pulping processes. The lignin component can also be the various purified products and derivatives made from lignin solids whether by removal of the hemicelluloses or wood sugars or by purification by various means to remove organic matter or to remove tall oil fatty acids or rosin products from the waste liquors, or the products obtained by reacting the waste liquors or contained solids with alkali, formaldehyde or other aldhehydes, monomeric alkylene oxides, and the like. The lignin or lignin derivative may be obtained from any species of wood commonly used for the manufacture of paper and may be the result of any of the several known processes for paper manufacture such as the sulfite process, the kraft process, and the like.

In the sulfite process for pulping wood the lignocellulose in the form of small pieces is cooked under pressure with an aqueous liquor containing a sulfite compound and frequently sulfurous acid. Calcium bisulfite, sodium bisulfite, magnesium bisulfite and ammonium bisulfite are used as sulfite compounds in this process. During cooking of the lignocellulose the pulping agent reacts preferentially with the lignin, liberating the cellulose. The liquor remaining after recovery of the cellulose pulp is known as sulfite spent liquor. It is an aqueous solution of lignosulfonic acids and salts, wood sugars, sugar sulfonic acids, inorganic compounds, and other reaction products. A typical sample of ammonium-base sulfite spent liquor derived from the pulping of western hemlock has the following approximate analysis:

| | Percent by weight (solids basis) |
|---|---|
| Ammonium lignosulfonates | 60–68 |
| Reducing sugars | 14–20 |
| Miscellaneous organic compounds | 10–25 |
| Inorganic compounds | 0.5–2 |

The various methods of isolating lignin are enumerated and described in detail by F. E. Brauns, Chemistry of Lignin, New York, Academic Press, Inc., 1952, chapter 5.

A major reason why complete use of lignin has not been made is that the chemical structure is still unknown. In the Chemistry of Lignin mentioned above it is stated that "lignin is one of the most complicated and elusive natural products known to chemists." Experimental evidence supports the belief that lignin is a high molecular weight resinous material composed of phenylpropane building blocks. Apparently the building blocks are combined in units which generally correspond in structure to four condensed molecules of coniferol. Coniferol is 4-hydroxy-3-methoxycinnamic alcohol. In the sulfite process, complex reactions take place resulting in the propane portion of about one-half of the lignin phenylpropane building blocks being sulfonated. According to one theory (Casey, J. P., Pulp and Paper Chemistry and Chemical Technology, volume 1, Pulping and Papermaking, New York, Interscience Publishers, Inc., 1952), half of the sulfonic acid groups in the lignosulfonic acids arise from sulfonation of hydroxyl groups originally present and the other half arise from sulfonation of hemiacetal hydroxyl groups formed by hydrolysis during cooking.

The quantity and kind of lignin material and polyether components employed in a composition of the present invention depends on the particular properties desired and the use to which the composition is to be applied. Other components such as polymeric poly(carboxylic acids) can be included in the compositions to enhance properties such as water resistance, flexibility and strength.

Aqueous compositions of this invention can be prepared by dissolving the solid polyether and lignin components in water together, or one at a time. The viscosity of an aqueous composition is usually higher than than for unmodified spent liquor of the same solids content, but not necessarily lower than an aqueous solution of the polyether component alone of the same solids content.

The aqueous polyether-lignin compositions of the present invention range from slightly thickened free-flowing solutions to syrups, and to water-containing compositions which are gelatinous and lacking in fluid flow. In general, the flowable aqueous compositions can contain between about 0.05 percent and 65 percent by weight total solids, with between about 0.1 and 99.5 percent by weight of the total solids being the polyether component. When high solids flowable solutions are desired, quantities of the polyether will necessarily be in the lower part of the range.

The bodying and thickening effects in water of many of the compositions of this invention are much greater than would be expected by the simple addition of a thickening agent. An unusual and unexpected rheological property is observed whereby a relatively non-viscous polyether-lignosulfonate aqueous solution is caused to increase tremendously in viscosity by the application of shearing stress, such as by stirring, and subsequently returns to its original viscosity after sufficient time is allowed for relaxation. This phenomenon has been defined as rheopexy. It appears to be completely absent from an aqueous solution of either the polyether or lignosulfonate component alone.

The thickening of aqueous lignosulfonate solutions is substantial when there is used as little as 87 p.p.m. polyether based on total solution weight. There is no practical upper limit of polyether to be employed to produce thickening, since compositions can be made and thickening observed at any polyether concentration above the minimum value which produces a measurable thickening effect.

The rheopectic thickening effect is observed in solutions of lignosulfonic acids and their salts when there is employed from about 0.05 percent by weight to 16 percent by weight or higher, based on total solids, of polyether having a reduced viscosity in the range of about 7.5 to 100. For the compositions containing low polyether concentrations to be effective, the reduced viscosity of the polyether must be high. When the thickening effect is lost by aging from a solution originally exhibiting rheopexy, it can be frequently restored by addition of more polyether. Rheopexy has been observed in the pH range of about 1.5 to 12 and at concentrations of 4 percent to 11 percent by weight total solids in the solution. This property persists at temperatures up to about 80° C.

High solids solutions are favored by lower ratios of polyether component, and by lower molecular weight polyethers. Concentrations of easily flowable solutions are limited at the upper end by spent liquor lignosulfonate values of about 65 percent by weight solids. An easily spreadable water base adhesive of 25 weight percent solids is obtained with equal parts by weight sulfite spent liquor solids and poly(ethylene oxide) of molecular weight in the range between about 18,000 and one million.

Initial tack of aqueous polyether-lignosulfonate solutions, like thickening, is noticeably improved at low concentrations of high molecular weight polyether resins, such as, for example, 0.1 percent to 1.0 percent by weight based on the total solids content. At these ratios, the effect of poly(ethylene oxide) having a reduced viscosity of 25 (molecular weight of about 3 million) is substantially greater than poly(ethylene oxide) having a reduced viscosity of 3. The latter poly(ethylene oxide) does not noticeably improve the sulfite spent liquors at these concentrations. At 25 to 30 percent total solids concentration, a 50/50 blend of sulfite spent liquor solids and poly(ethylene oxide) resin having a molecular weight in the range between about 18,000 and one million has approximately comparable initial tack as compared to the unmodified sulfite spent liquors. On the other hand, permanent tack of this same composition is much superior, and results in extensive tearing of cellulose fiber surfaces when glued sheets of paper or board are pulled apart after short drying periods.

Thus, the preferred range of polyether content for aqueous compositions to be employed as water-based adhesives when initial tack is important, is between about 0.05 weight percent to 50 weight percent based on total solids. The higher molecular weight polyethers are more effective at the lower polyether to lignosulfonate ratios in the compositions.

A particularly interesting and valuable aspect of the present invention is the treatment of sulfite spent liquors with polyether to cause precipitation of the solids content of the spent liquor and thereby permitting recovery of a solid polyether-lignin composition of this invention. This process provides a convenient and economic method of recovering the useful lignin content of sulfite spent liquors, and furthermore provides directly the useful solid polyether-lignosulfonate compositions of the present invention.

The precipitation of the lignosulfonate material from the spent liquor is accomplished by adding polyether to the spent liquor in a quantity between about 0.5 and 50 weight percent, and preferably between 1 and 10 weight percent, based on the weight of the solids content of the spent liquor, at a pH in the range below 3, and preferably at a pH in the range below 2.

A particularly effective method of precipitating sulfite spent liquor solids is by the addition of between about 5 and 20 parts of aqueous 1 percent by weight of poly(ethylene oxide) (approximately reduced viscosity of 60) and between about 2 and 25 parts by weight of concentrated mineral acid (e.g., sulfuric acid or hydrochloric acid) to 100 parts of sulfite spent liquor of approximately 10 percent solids by weight. A precipitate forms immediately upon mixing which, after filtration and drying, is found to contain a combining ratio of spent liquor solids to polyether as high as 10 or more. The spent liquors preferably should contain between about 5 percent and 35 percent total solids by weight. The polyether should have a molecular weight in the range between eighteen thousand and ten million, preferably in the range between about five hundred thousand to ten million, and more preferably between six million and ten million. Under favorable conditions, about one-fourth of the spent liquor solids is precipitated when using from about 0.5 percent to 10 percent by weight polyether based on the total weight of the spent liquor solids.

Lignosulfonates derived from alkali lignin (including from "thiolignin" produced by kraft pulping) are also precipitated by means of this process. The effective pH range is much wider in these instances, being in the range below 11.

As mentioned previously, compositions of the present invention can be prepared in solid form by mixing polyether resin with spent liquor solids. The solid materials are preferably dry-blended thermoplastically on a mill or calender to obtain a homogeneous composition. The composition can be compression molded to produce plaques which are quite flexible, translucent, glossy and exhibit appreciable elongation.

The range of compatibilities of the polyether and spent liquor solids in the resin compositions may range from less than 1 percent to over 99 percent. Certain preferred ranges in concentration are employed depending on the specific applications for which the compositions are to be used. When noticeable flexibility in films is desired, the compositions should contain at least 15 percent by weight, and up to about 100 percent by weight or higher, of polyether, based on the weight of spent liquor solids. When it is desirable that the films be flexible and extensible, the concentration of polyether should be in the range above about 100 percent, based on the weight of spent liquor solids. It has been found that the flexibility of films prepared from the compositions of this invention increases as the content of the polyether increases and as the molecular weight of the polyether increases.

When the compositions are intended for use in molding applications, at least 15 percent by weight, and up to about 300 percent by weight or higher, of polyether, based on the weight of spent liquor solids, should be employed and preferably for substantial increase in flexibility, elongation and impact resistance, the polyether should be employed in a quantity between about 100 and 300 weight percent, or higher.

The water-sensitivity (solution rate) of the polyether-lignin resin compositions of the present invention decreases as the weight ratio of the polyether increases and as the molecular weight of the polyether increases. It is further characteristic that the water-sensitivity of the compositions decreases when the less water-soluble polyether materials are employed, e.g., a poly(ethylene oxide-propylene oxide) copolymer provides better water resistance than does poly(ethylene oxide) homopolymer of comparable molecular weight.

A useful method of decreasing the water-sensitivity of the compositions of this invention and also improving other properties such as flexibility, toughness and the like, is to include in the compositions a resinous polycarboxylic acid such as poly(acrylic acid). The quantity of polycarboxylic acid included in the composition will vary widely depending on many factors, but generally will be in the range between about 1 and 50 weight percent, based on the total solids weight of the composition, and preferably will be in the range between 5 and 30 weight percent.

Suitable polycarboxylic acids are preferably those which contain an average of from about 0.3 to about 1.7 free carboxylic acid groups per 100 molecular weight. The average molecular weight of the polycarboxylic acids contemplated is in the range of from about six hundred to about two million and higher. The carboxylic acid groups of the polycarboxylic acid should be attached to an organic polymer chain. Such chains can encompass the entire polymer as, for example, in poly(acrylic acid). The polycarboxylic acid component can also be a graft or block copolymer, and in such cases, the polymer chain containing the free carboxylic acid groups can be only a portion, preferably a major portion of the chain length of the overall polymer. The polycarboxylic acid polymer chain can also be contained in a polymer such as those made from styrene and acrylic acid by adjusting the ratios of the comonomers during polymerization to produce a polymer with a polycarboxylic acid polymer chain which is joined to a portion of the polymer composed largely or solely of polystyrene. The polycarboxylic acid can be obtained by homopolymerizing monomeric unsaturated carboxylic acids such as acrylic acid, methacrylic acid, ethacrylic acid, alpha-chloroacrylic acid, and the like. The polycarboxylic acids can also be prepared by copolymerizing a monocarboxylic acid of the acrylic series with polymerizable vinyl or vinylidene compounds such as styrene, vinyl toluene, vinyl benzoate, vinyl chloride, isobutylene, methacrolein, vinyl acetate, and the like. Polycarboxylic acids can also be prepared by carboxyalkylation of polymer containing a multiplicity of hydroxyl groups such as polyvinyl alcohol, partially hydrolyzed polyvinyl acetate, and the like. Carboxyalkylation can be accomplished by well-known methods such as by reaction with chloroacetic acid in the presence of alkali, or by reaction of acrylonitrile in the presence of an alkaline catalyst followed by subsequent hydrolysis of the nitrile groups.

The solid compositions of the present invention have a combination of advantageous properties not found in either the water-soluble polyether component or the lignin component singly. For example, poly(alkylene oxide) resins and related materials are characterized by high tensile strength, extremely high elongation at break, excellent resiliency and inherent flexibility. Such materials are excellent film formers, both when cast from water or organic solution, or when formed thermoplastically. While these materials are relatively low-cost, high polymers, there are nevertheless numerous applications in which the cost is too high, where at the same time such factors as color, transparency and taste of the film are of relatively minor importance. In other cases, it is desirable to increase the stiffness of the film, or increase the adhesiveness for adequate binder action. The cost of such film can be reduced, and stiffness increased by incorporation of various inert fillers into the plastic material. If such fillers are added in any substantial amount, however, the tensile strength of the film is seriously reduced at the same time, oftentimes resulting in a film or a binder material or an adhesive which is too weak to be useful in the application intended. The solid poly(alkylene oxide)-lignin compositions of the present invention which contain a major proportion of poly(alkylene oxide) are less expensive than poly(alkylene oxide) alone, and shaped articles of the poly(alkylene oxide)-lignin compositions have equivalent tensile strength and greater stiffness than straight poly(alkylene oxide).

By the practice of the present invention, the woodpulping waste liquors of the papermaking industry are modified to produce valuable compositions which are useful as adhesives, molding resins, film formers, tackifiers, fillers, binders, textile and cellulosic material coatings, and the like. The resinous compositions of the present invention are stronger, more flexible and have greatly improved impact resistance as compared to lignin and lignin derivatives. At the same time, thermoplastic processability is attained in such equipment as two-roll mills, Banbury and calender and molding machines, and laminating equipment. In addition to the advantages of these compositions in bulk form, advantages are also evident in free and supported films where there is exhibited notable flexibility and substantially reduced stiffness and brittleness compared to lignin material. Some of the compositions of the present invention exhibit substantial elongation as well as useful tensile strength properties. The compositions perform well as coatings because of their resiliency and adhesion to various substrates. Lignin materials, on the other hand, have little value as free or supported films because of their brittleness, rigidity, lack of strength and elongation, and low effective adhesion.

Aqueous solutions of lignins are characterized by low viscosities even at high solids concentrations, and lack body, pituitousness and tack. The invention compositions, even when they contain high percentages of lignosulfonates, yield higher viscosity water solutions ranging from thickened free-flowing solutions to water-containing compositions which are gelatinous and lacking in fluid flow. A further limiting characteristic of the lignins is their rapidity of dissolution in water. The compositions of this invention are less rapidly, and in some cases less extensively, dissolved by water. This decreased water sensitivity is desirable in many applications such as binders for soil and in adhesive applications.

The superior properties exhibited by the compositions of the present invention are greater than is to be expected from the additive properties of the polyether and lignin components. While not wishing to be limited in terms of mechanism, it is believed that the synergistic advantage attained is mainly due to a "complexing" or "association" of the polyether and lignin components. Such an association may be characterized by an interaction between the sulfonic acid groups and the phenolic hydroxy groups of the lignin material, on the one hand, with the etheric oxygen atoms of the polyether. This interaction is in the nature of a hydrogen bonding effect. The association mechanism probably takes place only to a limited extent in aqueous solutions since the lignosulfonate molecule would then be highly ionized. However, it would be favored by conditions restricting separation of the acidic hydrogen atoms from the sulfonic acid groups and from the phenolic hydroxy groups as in strongly acid solutions, or in the undissolved solids state.

The following examples will serve to illustrate specific embodiments of the invention.

*Example 1*

The lignin material used in this preparation was "Toranil" B which is desugared calcium lignosulfonate (Lake States East Corporation, Rhinelander, Wis.). The poly(ethylene oxide) used was made by batch polymerization in a 2.7-liter stainless steel autoclave operating at 30° C. and 400 to 600 p.s.i. 1205 grams of ethylene oxide, 191 grams of butane and 0.6 gram of strontium methylate catalyst were charged to the autoclave. After a five-hour reaction period, poly(ethylene oxide) was recovered which had a reduced viscosity of 6.53 at 30° C., a concentration of 0.2 gram in 100 milliliters of acetonitrile.

25 grams of the poly(theylene oxide) resin and 75 grams of "Toranil" B were charged to 250 grams of distilled water and the mixture was agitated until solution was complete. Similar solutions were prepared employing lignin to poly(ethylene oxide) ratios of 99 to 1, 97 to 3, 95 to 5 and 90 to 10. Films of each of these solutions were cast on glass slides and allowed to air-dry. The film containing 25 percent poly(ethylene oxide) to 75 percent "Toranil" B produced a continuous clear film. The films produced from the other solutions were similar in appearance except that they were mud-cracked. A film was prepared in the same manner as above containing equal parts poly(ethylene oxide) and "Toranil" B. The film was clear and continuous and was more flexible and extensible than the compositions containing lower quantities of poly (ethylene oxide). A cooling curve run on this material indicated a distinct solidification point at about 50° C. A portion of this film was baked for ten minutes at 100° C. and the tensile strength of the film, as determined by a Scott inclined plane tester, was 3,000 p.s.i. and the elongation at break was 45 percent.

*Example 2*

This example illustrates the use of a polyether as a coagulant for sulfite spent liquor. The sample of sulfite spent liquor employed in this example was obtained from the Marathon Company (Rothschild, Wis.) and had a total solids content of 10 percent, and a pH of 2.55 at 70° C. The poly(ethylene oxide) resin employed had a reduced viscosity of 60 in acetonitrile.

To 200 milliliters of sulfite spent liquor solution in a reaction flask was added 20 milliliters of a 1 percent solution of poly(ethylene oxide). The mixture was agitated for one-half hour after which time 100 milliliters of 0.2 N solution of hydrochloric acid was added, then an additional 148 milliliters of 2.0 N hydrochloric acid was added to provide a final pH below 1. A sticky, light yellow precipitate formed which was recovered by filtration. It was found that the precipitate could be redissolved by agitating in a large volume of water.

In a similar fashion, 15 grams of the 1.0 percent poly (ethylene oxide) solution was added to 100 milliliters of sulfite spent liquor containing 10 percent total solids and the mixture was agitated for thirty minutes. To this mixture was added 0.015 gram of a polyamine[1] in 5 milliliters of distilled water. This was followed by the dropwise addition of 50 milliliters of 5 N solution of hydrochloric acid. The precipitate which formed flocculated and was recovered by filtration. The precipitate was allowed to air-dry on the filter paper and the material was found to have a sizing effect and was readily pliable.

As a control test, 5 N hydrochloric acid was added to 100 milliliters of the same sulfite spent liquor until the pH was below 1, and no precipitation occurred.

*Example 3*

This example illustrates the compatibility and adhesiveness of a number of poly(alkylene oxide) resins in combination with both alkali and sulfite lignin derivatives.

Dilute aqueous solutions of each of the components were prepared and mixed in the proportions of dissolved solutes shown in Table I. The solutions were allowed to deaerate after mixing and films were cast and air-dried. There was no evidence of precipitation in the formation of the solutions. The compatibility of the dry films was judged on the basis of clarity of the film, freedom from haze when exposed to a strong beam of light, and general toughness and lack of exudate on the film surface. Adhesion to the glass slide was tested with a knife and judged relative to usual adhesion standards. All the films were found to be compatible. In general, the films prepared using poly(alkylene oxide) copolymers were sticky and gum-like and resembled pressure-sensitive adhesives.

The following materials are designated in Table I:

*Polyether A.*—Poly(ethylene oxide) having a reduced viscosity of 2.7.

*Polyether B.*—Poly(ethylene oxide) having a reduced viscosity of 7.3.

*Polyether C.*—Poly(ethylene oxide) having a reduced viscosity of 42.4.

*Polyether D.*—Poly(ethylene oxide) having a 5 per-

---

[1] Polyamine prepared by adding dropwise during 5 hours 326 grams of ethylene dichloride to 500 grams of tetraethylene pentamine in 500 grams of water at a temperature of 100° C., followed by refluxing of the reaction mixture for 16 hours at 100° C. to 110° C.

cent by weight aqueous solution viscosity of 1750 centipoises at 25° C. which is equivalent to a resin with reduced viscosity of approximately 4.

The (5:95) poly(propylene oxide-ethylene oxide) copolymer is a resin having a reduced viscosity of 2.9.

The (30:70) poly(propylene oxide-ethylene oxide) copolymer is a resin having a reduced viscosity of 1.5.

"Toranil" B is a desugared calcium lignosulfonate.

"Indulin" B is a refined sodium salt of alkali lignin.

"Indulin" C is a less refined sodium salt of alkali lignin.

"Marasperse" C is the calcium salt of lignosulfonic acid isolated from spent sulfite liquor, and containing about 14.2 percent by weight non-ligneous organics (moisture-free basis), but no reducing sugars.

"Marasperse" N is the sodium salt of lignosulfonic acid, isolated from spent sulfite liquor.

"Polyfon" 0 is a sodium salt of lignosulfonic acid (10.9 percent by weight sodium sulfonate groups) derived from kraft process liquors.

TABLE I

| Polyether | Lignin | Polyether-Lignin Ratio | Adhesion |
|---|---|---|---|
| Polyether B | "Toranil" B | 9:1 | Poor. |
| Do | "Indulin" B | 9:1 | Do. |
| Do | "Indulin" C | 9:1 | Do. |
| Do | "Marasperse" C | 9:1 | None. |
| Do | "Marasperse" N | 9:1 | Poor. |
| Polyether C | "Toranil" B | 9:1 | Good. |
| Do | "Indulin" B | 9:1 | Poor. |
| Do | "Indulin" C | 9:1 | None. |
| Do | "Marasperse" C | 9:1 | Poor. |
| Do | "Marasperse" N | 9:1 | Do. |
| Propylene oxide-ethylene oxide copolymer (5:95). | "Toranil" B | 9:1 | Fair. |
| Do | "Indulin" B | 9:1 | Good. |
| Do | "Indulin" C | 9:1 | Do. |
| Do | "Marasperse" C | 9:1 | Do. |
| Do | "Marasperse" N | 9:1 | Fair. |
| Polyether A | "Toranil" B | 9:1 | Poor. |
| Do | "Indulin" B | 9:1 | Good. |
| Do | "Indulin" C | 9:1 | Fair. |
| Do | "Marasperse" C | 9:1 | Good. |
| Do | "Marasperse" N | 9:1 | Do. |
| Polyether B | "Polyfon" O | 20:1 | Do. |
| Do | "Toranil" B | 1:1 | Do. |
| Do | "Indulin" B | 1:1 | Poor. |
| Do | "Marasperse" N | 1:1 | Good. |
| Do | None | | Poor. |
| Propylene oxide-ethylene oxide copolymer (30:70). | "Toranil" B | 1:1 | Fair. |
| Do | "Indulin" B | 1:1 | Good. |
| Do | "Marasperse" N | 1:1 | Fair. |
| Do | None | | Poor. |
| Polyether A | "Toranil" B | 1:1 | Very good. |
| Do | "Indulin" B | 1:1 | Good. |
| Do | "Marasperse" N | 1:1 | Poor. |
| Do | None | | Do. |
| Propylene oxide-ethylene oxide copolymer (30:70). | "Indulin" C | 1:1 | Good. |
| Do | "Marasperse" C | 1:1 | Poor. |
| Polyether B | "Indulin" C | 1:1 | Fair. Poor.[1] |
| Do | "Marasperse" C | 1:1 | Fair. Poor.[1] |
| Polyether C | "Toranil" B | 1:5 | Do. |
| Do | "Indulin" B | 1:5 | Fair. |
| Do | "Marasperse" N | 1:5 | Good. |
| Do | "Indulin" C | 1:5 | Do. |

[1] Adhesion to aluminum foil.

*Example 4*

80 grams of poly(ethylene oxide) resin (reduced viscosity of approximately 3 at 30° C. in acetonitrile) and 20 grams of "Marasperse" N were dry-blended for one hour on can rolls. The mixture of dry powders was then milled on a laboratory two-roll mill at 60° C. and was found to process easily. A water solution containing 25 percent by weight of the milled mixture was prepared by dissolving the solids on a set of can rolls. The viscosity of the solution as determined by a Brookfield Model RVF viscometer running at 2 r.p.m. with a No. 4 spindle was 19,100 centipoises at 23.4° C.

A 20 percent solids solution of poly(ethylene oxide) resin was prepared using the same resin as above. The viscosity of this solution under the same conditions was found to be 307,000 centipoises.

The 25 percent water solution of lignin-poly(ethylene oxide) was used to cast a film on glass at 50 mils wet thickness. After drying overnight, the resulting film was found to be tough and readily strippable from the glass plate.

*Example 5*

This example illustrates the use of a composition of the present invention to increase the compressive strength and compressive elasticity as well as the plastic limit of a heavy clay soil.

The sample of soil employed was paulding clay obtained from Paulding County, Ohio. The sample was thoroughly dried and ground to pass through a 60-mesh sieve. 300 grams of this soil was placed in a Brabender plastograph using a small pug mill mixing apparatus. To the dry soil in the plastograph was added a mixture of 69 grams of 1 percent poly(ethylene oxide) (1 percent by weight aqueous solution, viscosity of 6000 centipoises at 25° C.) in water solution premixed with 50 grams of 25 percent total solids sulfite spent liquor (Marathon Company, Rothschild, Wis.). The mixture of clay, sulfite spent liquor and poly(ethylene oxide) was agitated in the plastograph for fifteen minutes at high speed. The mixture was then removed from the plastograph and used to compact two cylinders of soil, $2^{13}/_{16}$ inches high by $1^{5}/_{16}$ inches in diameter, employing the Harvard miniature compaction apparatus. The cylinders were then air-dried. The above procedure was repeated for a control mixture containing 300 grams of paulding clay and 105.5 grams of distilled water.

The cylinders were tested for compressive strength in an Instron tester using the compression jig attachment. The speed of compression (cross-head speed) was 10 inches per minute in each case. The control sample without the addition of the lignin/poly(ethylene oxide) mixture was found to have a compressive strength of 247.6 p.s.i. and a compressive elasticity of 63,000 pounds per inch. The cylinders treated with the lignin-poly(ethylene oxide) mixture were found to have compressive strengths of 272 and 363.6 p.s.i., respectively, and compressive elasticity of 55,000 and 80,000 pounds per inch.

In a similar preparation using twice the concentration of poly(ethylene oxide) and sulfite spent liquor in the paulding clay, it was found that the plastic limit of the paulding clay soil was greatly increased.

*Example 6*

This example illustrates the substantial thickening of sulfite spent liquor by the addition of a small quantity of polyether.

The sulfite liquor employed was a coniferous sulfite spent liquor sample (Marathon Corporation, Rothschild, Wis.) which was the by-product from the calcium bisulfite-sulfur dioxide digestion process for making paper pulp from wood chips. The dark brown aqueous sulfite liquor (10 percent total solids) contained in addition to polymeric lignosulfonic acids, various sugars, sugar acids, sugar sulfonic acid, residual calcium salts, sulfurous acid, and so forth. The lignosulfonic acid polymers, ranging in molecular weight from about one thousand to about twenty thousand, constitute approximately 60 percent by weight of the sulfite liquor solids. The average extent of sulfonation corresponds approximately to about one sulfonic acid group per each two phenylpropane units.

A poly(ethylene oxide) solution was prepared by dissolving 0.1 gram of poly(ethylene oxide) (reduced viscosity of 69 at 20° C., concentration of 0.2 gram per 100 milliliters of acetonitrile) in 100 milliliters of distilled water. When 10 milliliters of this poly(ethylene oxide) solution was mixed with 100 milliliters of the sulfite spent liquor (specific gravity of about 1.04), the solution remained homogeneous and became substantially more viscous.

*Example 7*

To 209 grams of sulfite spent liquor (10 percent total solids) being stirred in a flask was added 20 grams of aqueous 1.0 percent by weight poly(ethylene oxide) solution (reduced viscosity of 69 at 20° C., concentration of 0.2 gram per 100 milliliters of acetonitrile). The pH of the mixture was lowered to 1.0 by the addition of 100 milliliters of 0.2 N hydrochloric acid solution followed by the addition of 148 milliliters of 2.0 N hydrochloric acid solution. Fifteen minutes after completion of the acid addition the agitation was stopped and the precipitate which had formed was removed by filtration. The recovered product was light yellow and extremely sticky.

*Example 8*

This example illustrates the preparation of an adhesive material from sulfite spent liquor, polyether, and a polycarboxylic acid.

104 grams of sulfite spent liquor (10 percent by weight total solids) and 10 grams of 1 percent by weight aqueous solution of poly(ethylene oxide) (same material as Example 6) were placed in a flask and to the mixture was added dropwise 50 milliliters of a 2.8 percent by weight concentration of aqueous poly(acrylic acid) (reduced viscosity of 1.4 at 30° C., concentration of 0.2 gram per 100 milliliters of water). The ratio of components in the composition on a solids basis was 87.7 percent by weight sulfite spent liquor solids, 0.8 percent by weight poly(ethylene oxide), and 11.5 percent by weight poly(acrylic acid). At the end of the addition of the poly(acrylic acid) solution there was recovered an extremely sticky precipitate which clung to the stirring blade.

*Example 9*

This example illustrates the precipitation of lignosulfonic acids by the addition of a resinous polyether under strongly acidic conditions.

To 100 milliliters of the sulfite spent liquor described in Example 6, which had been mixed with sufficient concentrated hydrochloric acid to lower the pH of the solution to 1, there was added 4.0 milliliters of aqueous 1.0 percent by weight poly(ethylene oxide) having a reduced viscosity similar to that described in Example 6. The precipitate which formed was increased in amount by the addition of 16 milliliters of the poly(ethylene oxide) solution together with 20 milliliters of additional concentrated hydrochloric acid. The precipitate which was collected on filter paper and dried in an oven at 100° C. weighed 1.82 grams. This corresponded to a combining ratio of 8.1. By combining ratio is meant the weight of sulfite liquor solids in the precipitate divided by the weight of polyether used for the precipitation.

100 milliliters of sulfite spent liquor, 20 milliliters of aqueous 2.5 percent by weight poly(ethylene oxide) solution (reduced viscosity of about 8 in acetonitrile) and 20 milliliters of concentrated hydrochloric acid were mixed as described above. The resulting precipitate was filtered and dried in an oven. The yield was 1.99 grams which corresponded to a combining ratio of 3.0.

100 milliliters of sulfite spent liquor, 10 milliliters of 1.0 percent by weight poly(ethylene oxide) solution (reduced viscosity of about 60 in acetonitrile), and 10 milliliters of concentrated hydrochloric acid were mixed together. The precipitate which resulted was filtered and dried in an oven. The dry weight of the precipitate was 0.76 gram which corresponded to a combining ratio of 6.6.

100 milliliters of sulfite spent liquor, 20 milliliters of aqueous 1.0 percent poly(ethylene oxide) solution (reduced viscosity of approximately 60 in acetonitrile), and 10 milliliters of concentrated hydrochloric acid were mixed together as described above. The precipitate after filtration and drying weighed 2.12 grams, which corresponded to a combining ratio of 9.6.

100 milliliters of sulfite spent liquor, 40 milliliters of aqueous 1.0 percent poly(ethylene oxide) (reduced viscosity of approximately 60 in acetonitrile), and 20 milliliters of concentrated hydrochloric acid were mixed together. The precipitate after filtration and drying weighed 2.09 grams which corresponded to a combining ratio of 4.2.

100 milliliters of sulfite spent liquor, 20 milliliters of aqueous 1.0 percent poly(ethylene oxide) solution (reduced viscosity of about 60 in acetonitrile), and 20 milliliters of concentrated hydrochloric acid were mixed together. The weight of the precipitate after filtration and drying was 2.08 grams which corresponded to a combining ratio of 9.4.

*Example 10*

The lignosulfonate material employed in the example was "Orzan" P (Crown-Zellerbach Corporation, Camas, Wash.). This material was a water-soluble tan powder containing approximately 6 percent by weight moisture. According to the manufacturer's analysis it contained 59.8 percent by weight (dry basis) lignosulfonic acids, and 4.2 percent by weight ash. The aqueous poly(ethylene oxide) solution used contained 6 percent by weight poly(ethylene oxide) (reduced viscosity of 6.43 at 30° C., concentration of 0.21 gram per 100 milliliters of water).

A clear viscous solution was obtained when 4.0 grams of the lignosulfonate powder was mixed with 66.7 grams of the 6.0 percent by weight poly(ethylene oxide) solution by agitation on can rolls for four hours. A flexible and adhesive film was obtained by pouring a portion of the poly(ethylene oxide)-lignosulfonate solution on a glass slide and allowing it to air-dry overnight. The film was smooth, slightly soft and had fair strength. These film characteristics persisted after a ten-minute bake period at 150° C. The composition was water-soluble throughout the baking period.

A film of the unmodified lignosulfonate material prepared in a similar manner as the film described above was hard, very brittle, and weak with poor adhesion after air-drying. It retained these physical characteristics after a bake period of ten minutes at 150° C.

*Example 11*

This example illustrates the unusual rheological property which is exhibited when relatively small amounts of a polyether are added to aqueous solutions of lignosulfonic acids and their derivatives.

The poly(ethylene oxide) resin and the sulfite spent liquor employed in this example are the same as that used in Example 6. The sulfite spent liquor material was characterized as having a pH of 2.5, a total solids content of 10.18 percent and a specific gravity of 1.044 (24° C.). Complete transition to a gel-like material occurred when a few milliliters of aqueous 1.0 percent by weight poly(ethylene oxide) solution was added to about 400 milliliters of the sulfite spent liquor followed by brief stirring. The high viscosity of the resultant mixture was many times greater than the viscosity of a solution of either component. The viscosity decreased slowly upon standing. A liquid of rather low viscosity was again obtained, which, however, could be induced to reform the gel-like material rapidly by vigorous stirring.

The poly(ethylene oxide)-sulfite spent liquor blend after standing overnight still exhibited rheopectic thickening action when stirred. The solution became thin and lost its rheopectic thickening property when its initial pH of 2.2 was raised to 10.3 by the addition of sodium hydroxide pellets. The rheopectic thickening property reappeared upon lowering the pH from 10.3 to 9.5 by the addition of 1 N hydrochloric acid.

Rheopexy is defined as the ability of a solution to increase significantly in viscosity as a result of shearing action and to retain this abnormal viscosity for a significant period which is then followed by a relaxation to an original low viscosity solution.

*Example 12*

This example further illustrates the shear-induced thickening property exhibited by a lignosulfonate material originating from a different pulping process than the one in the previous example.

The "Polyfon" O sodium lignosulfonate employed was stated by the manufacturer (West Virginia Pulp and Paper Company, Charleston, S.C.) to contain 10.9 percent by weight sodium sulfonate groups. The sodium lignosulfonate was a brown water-soluble powder completely free of hemicelluloses and wood sugars. The poly(ethylene oxide) resin employed had a reduced viscosity of 59.6 at 20° C., concentration of 0.2 gram per 100 milliliters of acetonitrile.

A homogeneous solution exhibiting the characteristic rheopectic behavior was obtained by mixing 12.0 grams of the 1.0 percent poly(ethylene oxide) solution with a solution prepared by dissolving 12.0 grams of the sodium lignosulfonate in 88.0 grams of water. The pH of the solution was 9.0, and the weight ratio of poly(ethylene oxide) to sodium lignosulfonate was 1 to 100.

*Example 13*

A series of solutions was prepared by blending measured portions of the sulfite spent liquor (identical to that of Example 6) with measured amounts of aqueous 1.0 percent by weight poly(ethylene oxide) solution (reduced viscosity of 59.6 at 20° C., concentration of 0.2 gram per 100 milliliters of acetonitrile).

| Sulfite Spent Liquor, ml. | Poly (ethylene oxide) | |
|---|---|---|
| | 1.0% by Wt. Aq. Soln., ml. | Approx. Wt. Percent Dry Basis |
| 100 | 50 | 4.5 |
| 100 | 100 | 9.0 |
| 100 | 200 | 16.8 |
| 10 | 50 | 32.0 |
| 10 | 120 | 52.9 |

The first three homogeneous solutions were noticeably rheopectic whereas the last two were viscous which showed little increase in viscosity upon stirring. All five solutions gave homogeneous water-soluble films when poured on glass plates and baked to dryness in an oven at 75° C. The first solution gave a crumbly material with negligible adhesion and the film from the second solution was brittle and easily chipped. The films from the last three solutions could be removed easily in strips with a knife blade. The film of the fourth solution exhibited some elongation and the film from the last solution could be cold drawn easily.

*Example 14*

This example illustrates the endurance of the shear-induced thickening property in a poly(ethylene oxide)-sodium lignosulfonate solution as measured by a rotational viscometer.

The poly(ethylene oxide) and sodium lignosulfonate materials were identical to those described in Example 12. A solution containing 30 grams of sodium lignosulfonate dissolved in 220 grams of water (pH 8.8) upon mixing with 30 grams of aqueous 1 percent by weight poly(ethylene oxide) solution gave a solution which increased in viscosity with shear and which relaxed upon standing. A measurable rate of viscosity rise resulted from shear provided by the rotation of a large viscometer spindle within a 249 gram sample of the solution. Recorded viscometer data are listed in Table II.

TABLE II.—VISCOSITY RECORDINGS

| Spindle Speed, r.p.m. | Shear Rate, Sec.⁻¹ | Elapsed Time After Beginning of Spindle Rotation, Min. | Recorded Viscosity, cps. |
|---|---|---|---|
| | | First Day (25° C.) | |
| 26 | 5 | 0.5 | 790 |
| | | 1.0 | 900 |
| | | 1.5 | 5,800 |
| | | 2.0 | 7,800 |
| | | Second Day (23.7° C.) | |
| 37 | 7 | 2 | nil |
| | | 5 | nil |
| | | 10 | 160 |
| | | 11 | 830 |
| | | 11.5 | 2,500 |
| | | 12 | 3,600 |
| | | 12.2 | 4,500 |
| | | Third Day (22.8° C.) | |
| 140 | 26 | 0.5 | nil |
| | | 0.75 | 107 |
| | | 1.0 | 270 |
| | | 1.5 | 380 |

*Example 15*

A composition was prepared from the same poly(ethylene oxide) and sulfite spent liquor employed in Example 13. The water solution of these components was allowed to evaporate by standing exposed to the room atmosphere until a sticky viscous tar-like material remained. A crude wood joint was prepared by spreading part of the material between two pieces of wood and pressing them together and curing for ten minutes in an oven at 150° C. Gluing of paper was accomplished readily by pressing a piece of paper against the second paper which had been coated with some of the same tar-like residue. The bonding material was dissolvable in water.

*Example 16*

A composition was prepared by blending poly(ethylene oxide) with sodium lignosulfonate on a 1 to 1 weight basis. The poly(ethylene oxide) employed had a 5 percent by weight solution viscosity of 1750 centipoises at 25° C., and the sodium lignosulfonate contained approximately 10.9 percent by weight sodium sulfonate groups (the same material as described in Example 12).

A solution of the two materials was prepared by mixing 200 grams of the 5 percent by weight poly(ethylene oxide) solution with 100 grams of 10 percent by weight aqueous solution of the sodium lignosulfonate which had previously been acidified to a pH of 2 by addition of 4 milliliters of concentrated hydrochloric acid. A film was prepared by pouring the solution on glass and drying it for sixteen hours in a forced draft oven at 70° C. The film was soft, fairly glossy and had good adhesion, flexibility and strength.

*Example 17*

This example illustrates thermoplastic processing of poly(ethylene oxide) and sulfite spent liquor dry solids.

The poly(ethylene oxide) employed had a reduced viscosity of 7.5 at 20° C., concentration of 0.2 gram in 100 milliliters of acetonitrile. The sulfite spent liquor was identical to that described in Example 11. The sulfite spent liquor was dried overnight in a tray at 50° C. to provide a brittle dry residue. The residue was pulverized in a mortar and screened to yield 21 grams of 80 mesh powder which was then added to 21 grams of the poly(ethylene oxide) resin while it was being fluxed on a two-roll mill at 80° C. The resulting sheet after cooling was flexible, extensible, smooth and exhibited stickiness when moistened.

A solution for adhesion tests which had the appearance of molasses was prepared by dissolving 10 grams of the milled sheet in 30 grams of water. A control solution was prepared by dissolving 0.5 gram of the sulfite spent liquor solids in 1.5 grams of water. Adhesion tests were performed with 19 mil by ½ inch x 10⅜ inch strips of Copco 18 Point Ionic Blank paperboard from Copco Paper Company. In each test a one-inch long section on the end of a strip of paperboard was coated with the solution. After a thirty-second air-dry period, the opposite end of the strip was pressed against the coated area. Pressure was applied to the bond by a 2000 gram weight during a measured time interval. In the following Table III, initial tack is rated as the portion of the coated section which appeared to be permanently bonded together after the indicated pressing times, and permanent tack is rated by the proportion of the coated area which exhibited fiber tear when pulled upon after air-drying for at least sixteen hours. The data in Table III demonstrate that the test solution gave a much improved permanent bond compared to the control solution, and the extent of bonding tends to improve with pressing time. Although initial tack obtained with the control solution is superior under these conditions the control exhibits no permanent tack.

TABLE III

| Pressing Time, Sec. | Initial Tack, Portion of Coated Area Held Together, Percent | Permanent Tack, Portion of Coated Area Showing Fiber Tear, Percent |
|---|---|---|
| | Test Solution | |
| 15 | 25 | 19 |
| 20 | 30 | 19 |
| 30 | 30 | 19 |
| 40 | 30 | 25 |
| 50 | 30 | 16 |
| 60 | 40 | 25 |
| 90 | 50 | 40 |
| 120 | 45 | 30 |
| | Control | |
| 15 | 100 | Nil |
| 30 | 100 | Nil |
| 60 | 100 | Nil |
| 90 | 100 | Nil |
| 120 | 100 | Nil |

Demonstration of utility as a remoistenable adhesive was carried out in a similar manner with the additional step of air-drying during a period of at least three hours between the original application of the adhesive solution and the initial formation of the adhesive bond. The air-dried coating of adhesive material was remoistened with water, air-dried for thirty seconds and pressed against uncoated board for various intervals. The following Table IV shows that the test material gave a greatly improved permanent bond as compared to the sulfite spent liquor coating, and that the portion of the coated area receiving permanent adhesion improved noticeably with pressing time. Values for initial tack for both the test and control solutions also increased with pressing time, and equal 100 percent when a two-minute pressing time is employed. The remoistening procedure as compared to the direct use of the original 25 percent by weight test solution gave substantial improvement in both initial and permanent tack.

TABLE IV

| Pressing Time, Sec. | Initial Tack, Portion of Coated Area Held Together, Percent | Permanent Tack, Portion of Coated Area Showing Fiber Tear, Percent |
|---|---|---|
| | Test Adhesive | |
| 15 | 45 | 30 |
| 20 | 45 | 30 |
| 30 | 50 | 38 |
| 40 | 56 | 45 |
| 50 | 70 | 56 |
| 60 | 80 | 75 |
| 90 | 94 | 80 |
| 120 | 100 | 94 |
| | Control | |
| 15 | 38 | Nil |
| 30 | 88 | Nil |
| 60 | 100 | Nil |
| 90 | 100 | Nil |
| 120 | 100 | Nil |

*Example 18*

A solution prepared by blending 143.3 grams of the sulfite spent liquor solution (10.2 percent total solids) with 300 grams of aqueous 5 percent by weight poly(ethylene oxide) solution (both materials identical to those in the previous example) was pituitous and rheopectic, and relaxed quickly upon standing. The solution was evaporated to dryness in a "Teflon" coated tray to form a slightly flexible film weighing 29.3 grams. This film was observed to flux readily on a two-roll mill operating at a temperature of 80° C. to 92° C. The milled material upon cooling was flexible, mildly extensible, translucent and smooth. A section of this sheeted material was placed in a preheated circular steel mold and subjected to a temperature of 125° C. and a pressure of 850 p.s.i. for two minutes. A flexible, translucent, slightly extensible, glossy plaque was formed.

*Example 19*

A solution was prepared by blending 19.6 grams of 10.2 percent solids by weight sulfite spent liquor (described in Example 11) with 2 grams of aqueous 1.0 percent by weight poly(ethylene oxide) (reduced viscosity of 25 at 20° C., concentration of 0.1 gram per 100 milliliters of water). The mixture was equivalent to a weight ratio of sulfite spent liquor solids to poly(ethylene oxide) of 100 to 1. A second solution was prepared in the identical manner with the exception that the poly(ethylene oxide) resin had a reduced viscosity of 3.4 at 20° C., concentration of 0.2 gram per 100 milliliters of acetonitrile. Initial tack was observed for the compositions using a test procedure similar to that described in Example 17. The solutions were applied with a spatula to ½-inch square sections at the ends of white strips of paper, 3.5 mil by ½ inch x 7 inches cut from stock (coating raw stock DB–626) obtained from the Mead Corporation, Dayton, Ohio.

In each test, the coated area was allowed to dry thirty seconds and the opposite end of the paper strip was pressed against the coated portion. The first solution provided a permanent bond to the entire coated area in contrast to the second solution or to unmodified sulfite spent liquor, both of which lacked sufficient initial tack to hold the ends of the paper strips together more than momentarily.

*Example 20*

This example illustrates the adhesion properties and thermoplastic processability of a poly(ethylene oxide)-alkali lignin composition.

The poly(ethylene oxide) employed had a reduced viscosity of 3.4 at 20° C., concentration of 0.2 gram in 100 milliliters of acetonitrile. The alkali lignin was "Indulin" B (a refined sodium salt of pine wood alkali lignin, from West Virginia Pulp and Paper Company, Charleston, S.C.; approximate analysis: 3–9 percent moisture, 8.0–11.0 percent ash, and a methoxyl content of about 13 percent).

25 grams of the alkali lignin sodium salt was added to 25 grams of the poly(ethylene oxide) resin while being fluxed eight minutes on a two-roll mill at about 70° C. to 72° C. The resulting chocolate brown sheet after cooling was flexible and smooth.

A homogeneous solution for adhesion tests prepared by dissolving 20 grams of the sheet in 60 grams of distilled water was viscous and pituitious, and had a pH of 8.7. A "control" solution was obtained by dissolving 10 grams of the alkali lignin in 30 grams of distilled water. Tests for initial and permanent tack, carried out as described in Example 17, showed the following results.

TABLE V

| Pressing Time, Sec. | Initial Tack, Portion of Coated Area Held Together, Percent | Permanent Tack, Portion of Coated Area Showing Fiber Tear, Percent |
|---|---|---|
| | Test Solution | |
| 15 | 50 | 38 |
| 20 | 50 | 38 |
| 30 | 75 | 50 |
| 40 | 100 | 80 |
| 50 | 100 | 90 |
| 60 | 100 | 94 |
| 90 | 100 | 94 |
| 120 | 90 | 75 |
| | Control | |
| 15 | Nil | Nil |
| 30 | 31 | Nil |
| 60 | 44 | Nil |
| 90 | 50 | Nil |
| 120 | 56 | Nil |

In the manner described in Example 17, the composition was tested as a remoistenable adhesive as shown by the following data.

TABLE VI

| Pressing Time, Sec. | Initial Tack, Portion of Coated Area Held Together, Percent | Permanent Tack, Portion of Coated Area Showing Fiber Tear, Percent |
|---|---|---|
| | Test Adhesive | |
| 15 | 87 | 69 |
| 20 | 75 | 59 |
| 30 | 94 | 75 |
| 40 | 81 | 62 |
| 50 | 87 | 78 |
| 60 | 100 | 87 |
| 90 | 94 | 81 |
| 120 | 100 | 87 |
| | Control | |
| 15 | 37 | Nil |
| 30 | 50 | Nil |
| 60 | 50 | Nil |
| 90 | 100 | Nil |
| 120 | 94 | Nil |

*Example 21*

This example illustrates the preparation of an aqueous, alkali lignin solution wherein improved initial tack is attained by the incorporation of 5 percent by weight poly(ethylene oxide).

The poly(ethylene oxide) resin employed had a reduced viscosity of 25 at 20° C., concentration of 0.1 gram in 100 milliliters of water, and the alkali lignin was the same as used in the previous example.

To 40 grams of a 19 percent by weight aqueous alkali lignin solution, the pH of which had been raised from 8.5 to 12.2 by adding 2.7 milliliters of 40 percent by weight sodium hydroxide aqueous solution, was added 40 grams of 1.0 percent by weight poly(ethylene oxide) aqueous solution. After mixing, a slightly viscous, pituitous, homogeneous and easily spreadable solution (pH 12.2) resulted which was suitable for adhesion tests.

An adhesion "control" solution (pH 12.2) having a lignin concentration of 10 percent by weight was prepared by diluting 20 grams of the alkali lignin sodium salt 19 percent by weight solution with 18 grams of water and one milliliter of the 40 percent by weight sodium hydroxide solution. The bulk viscosity of the lignin-poly(ethylene oxide) solution when "relaxed" was 75 centipoises at 25° C. as determined with a model RVF Brookfield viscometer (spindle No. 3, 20 r.p.m.). Immediately after stirring, the viscosity was 80 centipoises.

The following adhesion data, obtained with cardboard according to the procedure described in Example 17, demonstrated that at low pressure times there was improved initial tack over the control.

TABLE VII

| Pressing Time, Seconds | Initial Tack, Portion of Coated Area Held Toegther, Percent | |
|---|---|---|
| | Test Adhesive | Control |
| 15 | 81 | 13 |
| 30 | 94 | 19 |
| 45 | 81 | 81 |
| 60 | 63 | 81 |
| 90 | 75 | 25 |
| 120 | 69 | 88 |

Six additional solution mixtures of the same ingredients and with the same solids ratio, but with progressively lower pH values, showed greater thickening and greater rheopexy, Hydrochloric acid was used for pH adjustment for values below 8.5.

TABLE VIII

| Solution No. | pH | Properties | Bulk viscosity, centipoises | |
|---|---|---|---|---|
| | | | Relaxed | Stirred |
| 1 | 12.2 | Pituitous, homogeneous | 75 | 80 |
| 2 | 11.1 | Pituitous, homogeneous, more viscous and rheopectic. | 110 | 120 |
| 3 | 9.95 | Tough, gel-like structure, very rheopectic. | 35,700 | >2,000,000 |
| 4 | 9.0 | Non-homogeneous, tough, gel-like structure. | ¹10,500 | ¹27,500 |
| 5 | 7.9 | Separation to a small elastomeric gel, and a thin phase which gelled upon stirring. | ¹31,200 | ¹65,000 |
| 6 | 7.3 | Larger amount of precipitation. | ¹50,000 | ¹138,000 |
| 7 | 6.3 | Precipitate of suspended, soft, weak particles which can be handled without sticking. | | |

¹ Readings fluxuated due to non-homogeneity.

Slightly improved permanent tack compared to a control solution was exhibited by solution No. 2 (pH 11.1); greater improvement in permanent tack, along with an excellent record of initial tack resulted upon concentration by evaporation of solution No. 1 from a lignin content of 10 percent by weight to 17 percent. Permanent tack was just short of enough to cause fiber tear at this poly(ethylene oxide) ratio.

*Example 22*

This example demonstrates adhesive characteristics for blends of poly(ethylene oxide) with purified lignosulfonic acid fractions originating each from (a) a sulfonated alkali lignin, and (b) a sulfite spent liquor source. The poly(ethylene oxide) employed had a reduced viscosity of 3.4 at 20° C., concentration of 0.2 gram in 100 milliliters of acetonitrile.

A solution of fractionated and purified lignosulfonic acid was prepared for this example by dialysis and ion exchange of a solution of the sodium lignosulfonate material ("Polyfon," grade 0) described and used in Example 12. A solution containing 62.2 grams of dialyzed lignosulfonate contained in 4040 grams of a 1.54 percent by weight clear brown solution of pH 8.40 was obtained after three days dialysis of 228 grams (dry basis) of sodium lignosulfonate starting material initially present in 1578 grams of a 14.43 percent by weight solids solution. The dialysis container was a 4 inch (I.D.) by 6 foot vertically mounted, Pyrex pipe having a water inlet near the bottom and overflow at the top. During dialysis the starting solution, contained in cellulose tubing (Visking Company, precision cellulose casing C–65X50) and clamped off with sufficient air inside the tubing to avoid bursting, was suspended in the water-filled pipe in which the rate of water flow while slower on the first day approximated 120 liters per hour during the next two days. The pH of the original solution was 9.70.

The dialyzed sodium lignosulfonate was converted to the free acid by ion exchange with an acidified, synthetic cation exchange resin (Rohm and Haas Company, Amberlite IR–120). Three pounds of the exchange resin was supported in a two inch by fifty inch vertically mounted Pyrex tube whereby flow rates of liquids through the tube could be controlled at the bottom outlet by a stopcock. The resin was activated with two liters of 10 percent by weight sulfuric acid flowing at an approximate rate of one liter per hour followed by sufficient distilled water to give a pH of 6.4 for the final effluent. Passage of 3500 grams of the dialyzed sodium lignosulfonate solution through the activated resin at an approximate rate of one liter per hour yielded 3222 grams of product solution. Before combining with poly(ethylene oxide), the ion exchange solution was concentrated to a solids content of 10.5 percent by weight in a forced draft oven at 50° C. The equivalent weight of the purified lignosulfonic acid was determined to be 782 by potentiometric titration with sodium hydroxide. The equivalence point (point of inflection in the potentiometric titration curve) occurred at pH 5.8. From this result it is easily calculated that the sodium salt of this lignosulfonic acid would have 12.8 percent by weight sodium sulfonate groups.

Mixing of 5.0 grams of aqueous 10.5 percent by weight lignosulfonic acid separated from a sulfonated alkali lignin with 5.0 grams of aqueous 10.0 percent by weight poly(ethylene oxide) gave a viscous, sticky solution which was tested for adhesion to paperboard by the same procedure. Data in the following table show results similar to the lignosulfonate material of section (b) below.

clear, flexible and had good adhesion to glass. It was found to be 11 percent by weight water-insoluble when rolled twenty-four hours at room temperature with two hundred times its weight of water.

(b) Calcium lignosulfonate in the amount of 450 grams dissolved in 1050 grams of distilled water was enclosed in a six foot length of 1⅞ inch diameter cellulose casing (dialysis tubing, Visking Company) and dialyzed for six days in the equipment described in section (a), using a water flow rate of 120 to 150 liters per hour. An identical charge was dialyzed in the same manner during four days. The product solutions, each having a pH of 7.65, and weighing 3150 grams and 3326 grams, respectively, were combined and filtered through No. 42 Whatman filter paper which removed about 20 grams (dry basis) of insoluble residue.

Ion exchange of the dialyzed calcium lignosulfonate solution was performed twice using three pounds of reactivated synthetic cation exchange resin described in section (a). Sulfuric acid deactivation consisted of an initial batch treatment followed by treatment in a glass column containing a bed of the ion exchange material as described in the cited example using a flow rate of two liters per hour. The ion exchange solution having a pH of 1.0 and weighing 6050 grams, was concentrated in a rotary, vacuum dryer at a temperature of 30° C. to 50° C., and an absolute pressure of 10 millimeters to 15 millimeters of mercury to a final solids concentration of 10.16 percent by weight. At an intermediate stage of the evaporation, there was present 1150 grams of an 8.10 weight percent solution. Determination of the equivalent weight on a sample of this lignosulfonic acid solution by titration with 0.1 N sodium hydroxide gave a value of 502. The pH at the equivalence point (point of inflection in the potentiometric titration curve) was 6.15. Lignosulfonic acid of this equivalent weight when neutralized with sodium hydroxide would contain 19.7 percent by weight sodium sulfonate groups.

Samples dried at 110° C. for analyses were the original calcium lignosulfonate powder, the dialyzed and filtered calcium lignosulfonate solution and the solution of free lignosulfonic acid from the ion exchange column. Analyses for calcium and sodium were obtained by the flame photometer method, and reduced viscosities were determined with a No. 0 Ubbelohde viscometer at 30° C. and a concentration of 1.00 gram per 100 milliliters of aqueous solution. Analytical results are summarized in the following table.

| Dry Sample | Sodium, Percent by Weight | Calcium, Percent by Weight | Reduced Viscosity | Equivalent Weight | Calculated Sodium Sulfonate Groups in Neutral Salt, Percent by Weight |
|---|---|---|---|---|---|
| Untreated Calcium Lignosulfonate | 3.32 | 3.28 | 0.036 | | |
| Dialyzed Calcium Lignosulfonate | 0.06 | 3.43 | | | |
| Lignosulfonic Acid from ion exchanger | 0.008 | 0.014 | 0.066 | 502 | 19.7 |

TABLE IX

| Pressing Time, Sec. | Initial Tack, Portion of Coated Area Held Together, Percent | Permanent Tack, Portion of Coated Area Showing Fiber Tear, Percent |
|---|---|---|
| Test Solution | | |
| 60 | 63 | 50 |
| 90 | 94 | 91 |
| 120 | 100 | 94 |
| Control | | |
| 60 | 88 | Nil |
| 90 | 68 | Nil |
| 120 | 100 | Nil |

This composition also exhibited utility as a remoistenable adhesive. A film prepared by casting a 20 mil thick wet film on a glass plate and drying in an oven at 50° C. for twenty-three hours and at 75° C. for one hour was A sample of the purified lignosulfonic acid solution of 10.16 percent by weight concentration weighing 2.3186 grams was mixed with 5.00 grams of aqueous 5.0 percent by weight poly(ethylene oxide) (reduced viscosity 3.7 at 20° C. and a concentration of 0.200 gram per 100 milliliters of acetonitrile) to form a 1 to 1 blend in water. The homogeneous solution in a four ounce wide mouth bottle was dried overnight at 75° C. in a forced draft oven and baked for thirty minutes at 150° C. to give 0.5510 gram of a dark brown, hard, slightly brittle, strong film. After extraction of this film for twenty-four hours at 25° C. by agitation on can rolls with 90 grams of water there remained an insoluble fraction with wet weight of 0.604 gram and dry weight after drying to constant weight during a period of eighteen hours at 100° C. of 0.3425 gram. This latter quantity is 62.2 percent of the weight of the baked film before extraction.

A sample of 50.0 grams of the 10.16 percent by weight lignosulfonic acid solution became very viscous when mixed with 2.0 grams of aqueous 2.0 percent by weight high molecular weight poly(ethylene oxide) resin of reduced viscosity 41.1 at 30° C. and a concentration of 0.20 gram per 100 milliliters of water. These quantities correspond to a solids ratio of poly(ethylene oxide) to lignosulfonic acid of 1 to 127 and a solids concentration of 9.8 weight percent. Initial agitation consisting of rapid stirring with a spatula imparted a high viscosity, and stringy consistency to the solution. The solution then relaxed upon standing to form a thin fluid of much lower viscosity which again became viscous and pituitous with repeated stirring.

Mixing of 5.0 grams of aqueous 10.9 percent by weight lignosulfonic acid with 5.0 grams of aqueous 10.0 percent by weight poly(ethylene oxide) gave a syrupy, pituitous solution which was tested for adhesion to paperboard by the procedure described in Example 17. Data listed in the following table show good initial tack, and permanent tack that is far superior to the lignosulfonic acid "control" solution containing no poly(ethylene oxide).

TABLE X

| Pressing Time, Sec. | Initial Tack, Portion of Coated Area Held Together, Percent | Permanent Tack, Portion of Coated Area Showing Fiber Tear, Percent |
|---|---|---|
| Test Solution | | |
| 60 | 62 | 50 |
| 90 | 94 | 81 |
| 120 | 100 | 88 |
| Control | | |
| 60 | 94 | Nil |
| 90 | 88 | Nil |
| 120 | 94 | Nil |

This composition also exhibited utility as a remoistenable adhesive. A film prepared by pouring part of the aqueous blend of 1 to 1 ratio (solids basis) into a glass dish and drying in an oven at 50° C. for twenty-three hours and at 75° C. for one hour was clear, flexible and strong. It was 22 percent by weight water-insoluble.

What is claimed is:

1. A solid, water-soluble association product of a blend of water-soluble resinous polymerized ethylene oxide having at least an average of about four hundred non-cyclic aliphatic oxygen ether groups and a reduced viscosity above about 0.5, determined by the dissolution of 0.2 gram of polymerized ethylene oxide in 100 milliliters of acetonitrile at 30° C., and lignin obtained from effluent cooking solutions recovered as waste liquor from pulping processes.

2. A process for precipitating woodpulping spent liquor solids which comprises treating spent liquor having a pH below about 3 with water-soluble resinous polymerized ethylene oxide having at least an average of about four hundred non-cyclic aliphatic oxygen ether groups and a reduced viscosity about about 0.5, determined by dissolving 0.2 gram of polymerized ethylene oxide in 100 milliliters of acetonitrile at 30° C.

3. A process for producing a solid polymerized ethylene oxide-lignosulfonate composition which comprises treating at a pH below about 3 sulfite spent liquor with water-soluble, resinous polymerized ethylene oxide causing precipitation of said composition, said water-soluble, resinous polymerized ethylene oxide having a reduced viscosity above about 0.5, determined by dissolving 0.2 gram of polymerized ethylene oxide in 100 milliliters of acetonitrile at 30° C., and at least an average of about four hundred non-cyclic aliphatic oxygen ether groups.

4. A substrate coated with an adhesive composition comprising the association product of water-soluble, resinous polymerized ethylene oxide having a reduced viscosity above about 0.5, determined by dissolving 0.2 gram of polymerized ethylene oxide in 100 milliliters of acetonitrile at 30° C., and at least an average of about four hundred non-cyclic aliphatic oxygen ether groups, and lignin obtained from effluent cooking solutions recovered as waste liquor from pulping processes.

5. An aqueous solution exhibiting rheopexy comprising from about 0.05 percent by weight to about 16 percent by weight, based on the total solids in said solution, of water-soluble, resinous polymerized ethylene oxide having at least an average of about four hundred non-cyclic aliphatic oxygen ether groups and a reduced viscosity of about 7.5 to about 100, determined by dissolving 0.2 gram of polymerized ethylene oxide in 100 milliliters of acetonitrile at 30° C., and lignin selected from the group consisting of lignosulfonic acids and salts of lignosulfonic acids, said solution possessing a pH in the range of about 1.5 to about 12 and having a temperature of up to 80° C.

6. A resinous composition comprising an organic polycarboxylic acid containing from about 0.3 to about 1.7 free carboxylic acid groups per 100 molecular weight and possessing a molecular weight above about six hundred, water-soluble, resinous polymerized ethylene oxide having at least an average of about four hundred non-cyclic aliphatic oxygen ether groups and a reduced viscosity above about 0.5, determined by dissolving 0.2 gram of polymerized ethylene oxide in 100 milliters of acetonitrile at 30° C., and lignin obtained from effluent cooking solutions recovered as waste liquor from pulping processes.

References Cited

UNITED STATES PATENTS

| 2,040,212 | 5/1936 | Orthner et al. | 260—17.5 |
| 2,394,910 | 2/1946 | Gresham | 260—2 |
| 2,443,889 | 6/1948 | Bruce et al. | 260—17.5 |
| 2,588,362 | 3/1952 | Danison | 260—17.5 |
| 2,667,462 | 1/1954 | Wildish et al. | 260—17.5 |
| 2,683,706 | 7/1954 | Muller | 260—17.5 |
| 2,706,182 | 4/1955 | Pruitt et al. | 260—2 |
| 2,845,397 | 7/1958 | Mills | 260—17.5 |
| 2,849,314 | 8/1958 | Goss | 260—17.5 |
| 2,870,100 | 1/1959 | Stewart | 260—2 |
| 3,125,544 | 3/1964 | Winslow et al. | 260—838 |
| 3,149,085 | 9/1964 | Ball et al. | 260—17.5 |

OTHER REFERENCES

Warth: The Chemistry and Technology of Waxes, 1956, Reinhold Publishing Corp., New York, pages 449 and 665.

Gortner et al.: Outlines of Biochemistry, pp. 742–747, published by John Wiley & Sons.

WILLIAM H. SHORT, *Primary Examiner.*

ALFONSO D. SULLIVAN, LEON J. BERCOVITZ,
*Examiners.*

J. ZIEGLER, J. NORRIS, *Assistant Examiner.*